UNITED STATES PATENT OFFICE.

HYLEMAN ALISON WEBSTER, OF COLUMBIA, TENNESSEE, ASSIGNOR TO JOHN J. GRAY, JR., OF ROCKDALE, TENNESSEE.

PROCESS OF PRODUCING IRON PHOSPHID FROM IRON PHOSPHATIC MATERIAL.

1,264,237.    Specification of Letters Patent.    Patented Apr. 30, 1918.

No Drawing.    Application filed October 13, 1916.   Serial No. 125,410.

*To all whom it may concern:*

Be it known that I, HYLEMAN ALISON WEBSTER, a citizen of the United States, residing at Columbia, in the county of Maury and State of Tennessee, have invented certain new and useful Improvements in Processes of Producing Iron Phosphid from Iron Phosphatic Material; and I do hereby declare the following to be a full, clear, and exact description of the invention such as will enable others skilled in the art to which it appertains to make and use the same.

This invention relates to the production of iron phosphid from iron phosphatic material in a suitable rotary kiln or furnace and has for its object to produce a process which will be efficient in action and comparatively inexpensive to carry out.

With these and other objects in view, the invention consists in the novel steps and combinations of steps constituting the process, all as will be more fully hereinafter disclosed and particularly pointed out in the claims.

In carrying out this invention I provide a suitable iron phosphate, either in the form of a natural ore, or artificially produced, and I suitably finely sub-divide the same, and together with a suitable quantity of carbon, I charge the same into a rotary kiln or furnace and the charge is ignited as for example, by an oil blast, a blast of air carrying finely divided carbon, or a flame fed from producer gas, or by a combination of two or more of these sources of heat. Where the raw material contains any substantial amount of impurities, suitable fluxing materials may be added, and the impurities thus slagged off.

In order that the precise invention may be the more clearly understood a charge made in accordance with the following proportions not taking account of the air and carbon admitted to the furnace by the fuel blast, is suitable for carrying out this process:

Phosphatic material _____ 14,700 lbs.
   Containing Fe$_3$(PO$_4$)$_2$ _____ 12,110 lbs.
   Containing silica SiO$_2$ _____ 2,590 lbs.
Lime stone _____ 4,300 lbs.
   Containing CaO _____ 2,410 lbs.
Coke _____ 5,000 lbs.

The material may be crushed to a quarter inch mesh or finer, and intimately mixed before being fed to the furnace.

The furnace is kept rotating while the flame is playing upon the charge and thus a very intimate contact between the ore and carbon is secured which enables the latter to combine with substantially all the oxygen in the phosphate and to leave behind the combined iron and phosphorus. The reaction takes place, in practice, at temperatures between say 1000° C. and 1500° C. depending upon the purity and physical condition of the charge material.

Since the process of necessity must be carried out at atmospheric pressure, I find in practice, that only about 22% or 25% of phosphorus can be retained in the iron. The remaining portion of the phosphorus passes off with the exit gases, and may be suitably recovered in the usual way. At the discharge end of the furnace, the slag and iron phosphid thus produced is passed into water, whereupon the slag becomes granulated, when the finely divided nodular iron phosphid and slag is passed over a suitable magnetic separator and the iron phosphid recovered.

When it is desired to recover the evolved phosphorus that would otherwise escape with the gases, it is only necessary to add to the charge a sufficient quantity of iron either in the metallic state or as an oxid suitably finely divided, whereupon substantially all the evolved phosphorus will appear in the ferro-phosphorus produced.

This process should be carefully distinguished from a process of producing ferro-phosphorus from iron phosphatic material in a blast furnace, in that in this process substantially the whole interior of the furnace becomes lined with incandescent carbon which acts to remove the combined oxygen. In a blast furnace, on the other hand, a considerable portion of the carbon is used in reducing carbon dioxid CO$_2$ to carbon monoxid CO, and it is found to be a fact in a blast furnace that this said CO gas does not reduce the iron phosphate, and is therefore lost as a deoxidizing agent. No such conditions are found to obtain in a rotary furnace. Accordingly, the rotary furnace is found to require a materially less quantity of carbon to produce high grade ferro-phosphorus than does a blast furnace.

It is desirable in most cases to use a quantity of carbon in excess of that required to remove all the oxygen from the phosphatic material in order to insure that no substantial quantity of phosphorus is wasted.

It is obvious that those skilled in the art may vary the details of the process without departing from the spirit of the invention, and therefore, I do not wish to be limited to the above disclosure except as may be required by the claims.

What I claim is:—

1. The process of making ferro-phosphorus in a rotary furnace from iron phosphatic material which consists in preparing a suitable sub-divided charge of said phosphatic material, a fluxing material and carbon; subjecting said charge to a reducing temperature while maintaining incandescent carbon throughout the charge, and while rotating the same to bring about an intimate contact between the constituents of the charge; and suitably recovering the ferro-phosphorus thus produced, substantially as described.

2. The process of making ferro-phosphorus in a rotary furnace from iron phosphatic material which consists in preparing a suitable sub-divided charge of said phosphatic material, a fluxing material and carbon, said carbon being in excess of theoretical requirements; subjecting said charge to a reducing temperature while maintaining incandescent carbon throughout the charge, and while rotating the same to bring about an intimate contact between the constituents of the charge; and suitably recovering the ferro-phosphorus thus produced, substantially as described.

3. The process of making ferro-phosphorus in a rotary furnace from iron phosphatic material which consists in preparing a suitable sub-divided charge of said phosphatic material, a fluxing material and carbon, said carbon being in excess of theoretical requirements; adding to said charge a quantity of iron bearing material to take up any elemental phosphorus which might otherwise pass off with the exit gases; subjecting said charge to a reducing temperature while maintaining incandescent carbon throughout the charge, and while rotating the same to bring about an intimate contact between the constituents of the charge; and suitably recovering the ferro-phosphorus thus produced, substantially as described.

In testimony whereof I affix my signature in presence of a witness.

HYLEMAN ALISON WEBSTER.

Witness:
T. A. WITHERSPOON.